(12) United States Patent
Ellinger et al.

(10) Patent No.: US 8,977,114 B2
(45) Date of Patent: Mar. 10, 2015

(54) DEVICE AND METHOD FOR THE THERMAL TREATMENT OF CORROSIVE GASES

(75) Inventors: Norbert Ellinger, Postmuenster (DE); Josef Wiesbauer, Braunau (AT); Robert Ring, Haiming (DE)

(73) Assignee: Wacker Chemie AG, Munich (DE)

( * ) Notice: Subject to any disclaimer, the term of this patent is extended or adjusted under 35 U.S.C. 154(b) by 316 days.

(21) Appl. No.: 13/489,442

(22) Filed: Jun. 5, 2012

(65) Prior Publication Data
US 2012/0328269 A1 Dec. 27, 2012

(30) Foreign Application Priority Data

Jun. 22, 2011 (DE) .......................... 10 2011 077 970

(51) Int. Cl.
| | |
|---|---|
| *H05B 3/60* | (2006.01) |
| *B01J 19/02* | (2006.01) |
| *B01J 19/00* | (2006.01) |
| *B01J 19/08* | (2006.01) |

(52) U.S. Cl.
CPC ........ *B01J 19/02* (2013.01); *B01J 2219/00135* (2013.01); *B01J 19/002* (2013.01); *B01J 19/0073* (2013.01); *B01J 19/087* (2013.01); *B01J 2219/00268* (2013.01); *B01J 2219/0813* (2013.01); *B01J 2219/0815* (2013.01); *B01J 2219/0828* (2013.01)
USPC .......................................... 392/312; 392/311

(58) Field of Classification Search
None
See application file for complete search history.

(56) References Cited

U.S. PATENT DOCUMENTS

| 4,331,698 | A | 5/1982 | Behensky et al. |
|---|---|---|---|
| 4,536,642 | A | 8/1985 | Hamster et al. |
| 7,842,135 | B2 * | 11/2010 | Teo et al. ...................... 118/725 |
| 2003/0006228 | A1 | 1/2003 | Nagatomo |
| 2006/0061295 | A1 | 3/2006 | Vollmar et al. |
| 2007/0073075 | A1 | 3/2007 | Paetzold et al. |

(Continued)

FOREIGN PATENT DOCUMENTS

| DE | 2928456 A1 | 1/1981 |
|---|---|---|
| DE | 3024320 A1 | 4/1982 |

(Continued)

OTHER PUBLICATIONS

Abstract for JP 2005-094827.

(Continued)

*Primary Examiner* — Thor Campbell
(74) *Attorney, Agent, or Firm* — Caesar, Rivise, Bernstein, Cohen & Pokotilow, Ltd.

(57) ABSTRACT

A device for thermal treatment of corrosive gases includes a chamber for heating gases in which there are at least four heating elements or four groups of heating elements including an electrically conductive material, wherein each heating element or group is connected to a separately regulatable and/or controllable subsystem of an electrical energy network and can thereby be heated by direct current flow, wherein each heating element or group can be controlled or regulated with respect to at least one either identical or different value of a parameter selected from the group consisting of temperature, heating power, current, voltage and resistance, or with respect to another heating element process variable, which can be influenced by the device, and wherein at least four regulatable and/or controllable subsystems are DC-isolated from ground potential. The invention also relates to a corresponding method for the thermal treatment of corrosive gases.

13 Claims, 3 Drawing Sheets

(56) References Cited

U.S. PATENT DOCUMENTS

| | | |
|---|---|---|
| 2008/0112875 A1 | 5/2008 | Garcia-Alonso et al. |
| 2010/0040803 A1 | 2/2010 | Kim et al. |
| 2010/0041215 A1 | 2/2010 | Kim et al. |
| 2010/0215562 A1 | 8/2010 | Sanchez et al. |
| 2011/0305604 A1* | 12/2011 | Stocklinger .................. 422/200 |

FOREIGN PATENT DOCUMENTS

| | | |
|---|---|---|
| DE | 202004004655 U1 | 7/2004 |
| DE | 202004014812 U1 | 12/2004 |
| DE | 102005005044 A1 | 8/2006 |
| DE | 102005046703 A1 | 4/2007 |
| DE | 102010029496 A1 | 3/2011 |
| JP | 2003019964 A2 | 1/2003 |
| JP | 2004364471 A2 | 12/2004 |
| JP | 2005094827 A2 | 4/2005 |
| JP | 2009538265 T2 | 11/2009 |
| WO | 2007136209 A1 | 11/2007 |

OTHER PUBLICATIONS

PatBase Abstract for JP 2004-364471.
PatBase abstract for DE 102010029496 A1.
PatBase abstract for DE 20 2004 004 655 U1.
Jaegar, "Leistungselektronik. Grundlagen und Anwendungen" [Basics and Applications of Power Electronics] {VDE-Verlag GmbH Berlin, 2nd Edition, 1980, ISBN: 3-8007-1114-1}, pp. 67-71.

* cited by examiner

DEVICE AND METHOD FOR THE THERMAL TREATMENT OF CORROSIVE GASES

BACKGROUND OF THE INVENTION

The invention relates to a method and a device for the thermal treatment of corrosive gases.

In particular, the invention relates to chemical reactors which comprise a reactor chamber in which the reaction gases are heated to a reaction temperature by means of heating elements or groups of heating elements, the heating elements being heated by direct current flow.

To this end, the heating elements are made of an electrically conductive material and are connected to a current supply.

DE 3024320 A1 discloses a device for the high-temperature treatment of silicon compounds in the vapor phase, consisting of a thermally insulated housing having gas inlet and gas outlet openings as well as inert resistance heaters, which are arranged between these openings and are heated by direct current flow. The heating of the electrically conductive resistor bodies is preferably carried out using a star circuit in a symmetrical polyphase AC system. The individual heater groups can in this case be regulated differently to one another, i.e. heated differently by electrical current flow.

The conversion of silicon tetrachloride with hydrogen into trichlorosilane is usually carried out in a reactor at high temperatures, at least 300° C., ideally at least 850° C., and at a pressure of 0-50 bar gauge, ideally 14-21 bar gauge.

As explained in DE 3024320 A1, these reactors are often heated by electrical heating elements made of graphite, CFC, silicon carbide or similar materials.

To this end, electrical current is fed directly through the electrically conductive heating elements and the electrical energy is converted into heat in the heating element by the electrical resistance.

According to DE 3024320 A1, heat exchangers are also used inside the reactor pressure containment. The heat exchanger unit may for example consist of a set of electrically unheated graphite tubes, which are used as gas discharge, around which fresh gas flows externally according to the counterflow principle.

DE 10 2005 005 044 A1 discloses a method for converting silicon tetrachloride into trichlorosilane, in which the cooling rate of the process gas is controlled in the heat exchanger. Materials such as silicon carbide, silicon nitride, quartz glass, graphite, or graphite coated with silicon carbide, are preferably used for the heat exchangers.

Other gas deviator elements, for example cylindrical deviator apparatus, may furthermore be present inside the reactor.

On grounds of chemical stability, these installed reactor components usually consist of carbon-containing materials such as graphite, silicon carbide, CFC and all other carbon-containing refractory materials and composite materials.

DE 10 2010 029 496 A1 discloses a method for supplying energy to a load in a deposition process, in which at least a first and a second electrical quantity are provided by means of a first and a second controllable electrical switching means, the electrical quantities differing in their magnitudes and the first or second electrical quantity being switchable alternately to the load, characterized in that the energy supply is carried out in cycles having a predetermined duration T0, each cycle comprising a set number n of full oscillations of the fundamental frequency f of the supply voltages, and in that the first electrical quantity is switched through for the energy supply of the load for a first fraction n1 and the second electrical quantity is switched through for the energy supply of the load for a second fraction n2.

FIG. 1 shows a conventional device for supplying current to the heating elements, as is also described in R. Jäger "Leistungselektronik. Grundlagen and Anwendungen" [Basics and Applications of Power Electronics] (VDE-Verlag GmbH Berlin, $2^{nd}$ Edition, ISBN: 3-8007-1114-1).

LIST OF THE REFERENCES USED IN FIG. 1

1 supply network/primary winding
2 transformer iron core with DC-isolated windings
3 secondary winding
4 phase-firing control
5 control apparatus
6 electrically resistive heating elements
7 electrode for connection to the heating elements
8 external bridge for series connection of a plurality of heating elements
9 internal bridge for series connection between two heating elements
10 vessel wall
11 group of heating elements By means of the supply network/primary winding 1, electrical energy is induced DC-isolated in three phases via an iron core 2 onto the secondary winding of a transformer.

Each phase of the secondary winding can be regulated separately from one another by means of phase-firing control 4 and 5. The respective phases are connected to the heater groups of the respective phases.

The individual heating elements 6 are usually configured as a bar, pole, tube, square tube or as a heating element having a star-shaped heater cross section. The easy processability especially of pure carbon materials in this context permits virtually all conceivable shapes. Meandering plates or cylinder segments may also be envisaged.

In order to maximize the heater surface (heat transfer surface or radiation surface) and minimize the specific heating power/unit area, the reactor is usually configured with three heating elements or three groups of heating elements 11 so as to load the electrical supply network as symmetrically as possible.

The straight heating elements 6, i.e. bar, pole, tube etc., are in this case electrically connected on one side to a neighboring heating element by a bridge 9 so that U-shaped heating elements are formed.

On the opposite side of the heating elements, the connection to the electrical current supply takes place via highly electrically conductive metal electrodes 7, which constitute the contact with the electrical energy source and simultaneously the pressure feedthrough through the reactor vessel.

Outside or inside the reactor, a plurality of heating elements are electrically connected in series 8, so that (a) the number of current feeds is minimal, (b) the electrical supply voltage is high and (c) the current strength to be delivered is in turn minimal.

These three parameters usually reduce the procurement costs for the required regulatable current supply.

An arrangement having three current feeds and three electrode feedthrough from the current supply to the reactor is ideal in relation to the current-supply and wiring costs.

This, however, presupposes series connection of all heating elements of a phase and star connection of these three series circuits in the reactor.

DE 29 28 456 A1 discloses support body groups made of silicon and heated by electrical current flow in a Siemens reactor for the deposition of highly pure silicon, which are arranged at least initially in a parallel circuit, the uniformity of the current in the support body groups connected in parallel being achieved by connecting current distributor chokes into the fanned-out parallel circuit. After ignition of the support bodies and the concomitant drop in voltage, the support body groups are switched from a parallel circuit to a series circuit.

Owing to the high voltage resulting from this, a parallel circuit is temporarily produced, which in the course of the process is converted back as soon as possible to a series circuit and therefore maximum possible voltage and equal current through all the heating elements.

DE 20 2004 014 812 U1 and DE 20 2004 004 655 U1 disclose corresponding circuit arrangements.

A significant disadvantage of all the arrangements provided in the prior art is that a large number of heating elements are connected in series to form large groups of heating elements. Owing to the chemically reactive environment, individual heating elements may either fail or become damaged, the result of which is that the entire associated group of heating elements fails. Even if only one heating element is damaged and the resistance of this heating element rises, this often leads automatically to the power at the defective position additionally increasing and therefore the temperature at the defective position rising, which additionally promotes further damage. Any minor damage thus generally leads inevitably to greater damage and finally to the need to shut down the reactor prematurely, which drastically reduces the economic viability of the process.

It has furthermore been found that the heating elements are clearly exposed to a very aggressive atmosphere, which acts even more aggressively on these components at high temperatures such as naturally occur in heating elements, for which reason great importance is also attached for example to the choice of material for these devices.

As has been experimentally shown, even minor resistance variations along the heating elements, which may also be due to material or production, may lead to temperature variations in the reactor which in turn cause even stronger resistance variations of the heating elements.

This positive feedback leads locally to heating element failure in the medium term, due to chemical attack or due to overload of the material by the constantly increasing energy delivery per unit area.

In most cases, this leads to reactor shutdown associated with long setup times and significant costs for new heating elements.

Another disadvantage with this conventional arrangement is also the high likelihood of ground faults.

Chemical attack of all the carbon-containing components gives rise to carbon deposits, which are electrically conductive and therefore lead to ground faults of the electrical energy network.

Furthermore, chemical attack can also lead to component failures of the internal components, which then entails flaking or splitting of small parts which can in turn lead to ground faults.

The problem with ground faults is that they cannot be distinguished from damage to the electrical feedthrough and the electrode seals.

If there is damage to the electrical feedthrough as well as to the electrode seal, the current supply and the reactor have to be taken out of operation since continued operation can lead to a sealing defect and an emission of reaction gas, which always needs to be prevented.

Reactors for the hydrogenation of silicon tetrachloride with hydrogen must therefore be able to withstand high temperatures and the corrosive nature of materials such as chlorosilanes and hydrogen chloride gas, which is formed during the hydrogenation method. Carbon-based materials, including carbon, graphite, carbon fiber composite materials and the like, are therefore typically used inside the reactor. A disadvantage with the carbon-containing materials is minor residual chemical reaction of the carbon with the reactant hydrogen or the hydrochloric acid which is also present, which leads to a limited heating element lifetime.

At high temperatures, graphite reacts with hydrogen to methane (=methanation). This leads to structural defects of the reactor and finally to reactor failures and a reduction of the service life. Since defective parts have to be replaced and new parts have to be installed, this is also associated with considerable financial outlay.

Methanation occurs in particular on the heaters which come directly in contact with hydrogen and silicon tetrachloride. Besides this, the counterflow heat exchangers can also be damaged by the reaction of hydrogen and graphite to form methane, particularly in the region of higher temperatures, especially in the region of the off-gases. Especially heating elements made of graphite exhibit the greatest corrosion susceptibility, since in this case hydrogen (mixed with silicon tetrachloride) encounters very hot surfaces.

In the prior art, efforts have been made to coat the graphite parts used with suitable materials in order that hydrogen can no longer react, or can only react to a reduced extent, with the components.

DE 10 2005 046 703 A1 proposes, for example, to coat the surface of the reactor chamber and the surface of the heating element in situ with silicon carbide before hydrogenation of the chlorosilane, and thus to reduce methanation of these components. This step of coating with silicon carbide takes place at a temperature of at least 1000° C.

Nevertheless, even with coated graphite parts, methanation and concomitant corrosion are still to be expected.

The object of the present invention is based on this problem.

BRIEF DESCRIPTION OF THE DRAWINGS

The invention will be described in conjunction with the following drawings, wherein.

DESCRIPTION OF THE INVENTION

Figure 1:
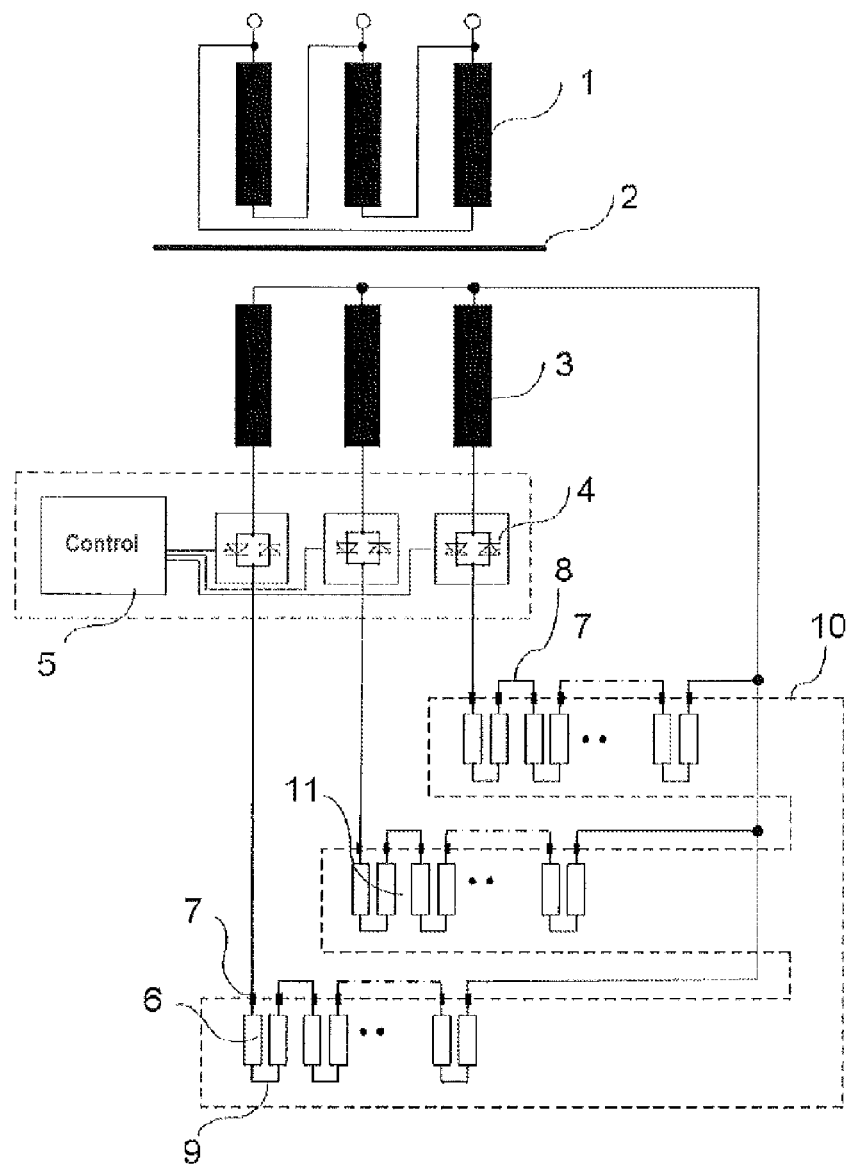
FIG. 1 shows a conventional device for supplying current to heating elements.

The object is achieved by a device for the thermal treatment of corrosive gases, comprising a chamber for heating gases in which there are at least four heating elements or four groups of heating elements consisting of an electrically conductive material, wherein each heating element or each group of heating elements is connected to a separately regulatable and/or controllable subsystem of an electrical energy network and can thereby be heated by direct current flow, wherein each separately regulatable and/or controllable heating element or each separately regulatable and/or controllable group of heating elements can be controlled or regulated with respect to at least one either identical or different value of a parameter in the group consisting of temperature, heating power, current, voltage, resistance or with respect to another process variable, which can be influenced by the device, of the heating element, and wherein at least four regulatable and/or controllable subsystems are DC-isolated from ground potential.

The object is likewise achieved by a method for the thermal treatment of corrosive gases, wherein gases contained in a chamber are heated by at least four heating elements or four groups of heating elements consisting of an electrically conductive material, wherein each heating element or each group of heating elements is connected to a separately regulatable and/or controllable subsystem of an electrical energy network, wherein each heating element or each group of heating elements is regulated and/or controlled separately and is heated by direct current flow, wherein each separately regulatable and/or controllable heating element or each separately regulatable and/or controllable group of heating elements is controlled or regulated with respect to at least one either identical or different value of a parameter in the group consisting of temperature, heating power, current, voltage, resistance or with respect to another process variable, which can be influenced by the device, of the heating element, and wherein at least four regulatable and/or controllable subsystems are DC-isolated from ground potential.

The individual heating element groups with their respective current or electrode terminals constitute DC-isolated subsystems of the overall arrangement, each with a separate current supply.

Preferably, the electrical energy network is also isolated from other supply networks cooperating with the reactor.

Preferably, all DC-isolated subsystems of the electrical energy network are monitored separately for any ground faults.

The electrodes of the current supply conventionally have an insulating seal.

Preferably, the operating voltage of the heating elements is respectively kept as low as possible, in order to minimize the likelihood of currents which damage the seal.

Preferably, the heating elements are protected or repaired by time-offset coating with SiC, Si or C during operation, without production interruption and at a constant reactor power. This is preferably done at a constant reactor power and/or without increasing the overall reactor temperature, so that no chemical attack takes place in other reactor zones.

Preferably, the temperature of the heating elements is varied constantly.

Preferably, the heating elements are protected by as far as possible avoiding the heater temperatures which are critical in relation to the heater corrosion and which are also dependent on the other process parameters.

To this end, for example, temperatures of some of the heating elements may be lowered or raised. This makes it possible to avoid the range of maximum chemical attack.

Preferably, by means of the separately regulated heating elements, different temperature zones in the treatment chamber are produced or undesired temperature differences are compensated for.

Preferably, the circuit arrangement is configured in three-phase arrangement.

In this way, the current harmonic content is minimized (all harmonics divisible by 3).

Preferably, the subsystems are based on two three-phase systems phase-shifted by 30°, in order to reduce network feedback due to current harmonics ($5^{th}$, $7^{th}$).

Preferably, commercially available voltage/current regulation apparatuses for DC, AC and any three-phase forms are used for the voltage or current regulation, for example AC power controllers, voltage inverters, rotary transformers, transductor etc.

Preferably, the various subsystems are operated in phase firing with heaters which have different electrical resistances, in order to obtain different thyristor control angles with the same heating power per heating element and therefore to reduce the higher-frequency network feedback ($>13^{th}$).

Preferably, the circuit arrangement is operated with a fundamental compensation system or a harmonic compensation system, in order to optimize the power factor.

Preferably, the individual subsystems are operated in wave-packet or phase-firing control.

Particularly preferably, operation is carried out in wave packet control with controllers which are temporally matched to one another.

Also preferred is operation of the individual subsystems with sine voltage regulators, which also receive sinusoidal current on the primary side without current harmonics.

Preferably, all the voltage/current regulators are arranged so that they can be replaced during operation of the rest of the system.

Preferably, the voltage/current regulators are configured to be shortcircuit-proof and freewheel-proof.

Preferably, the voltage/current regulators are provided with current limitation.

In order to increase the heating element lifetime, the heating elements are preferably subdivided into as many separately controllable and/or regulatable units as possible, which can also be switched off separately.

Figure 2:
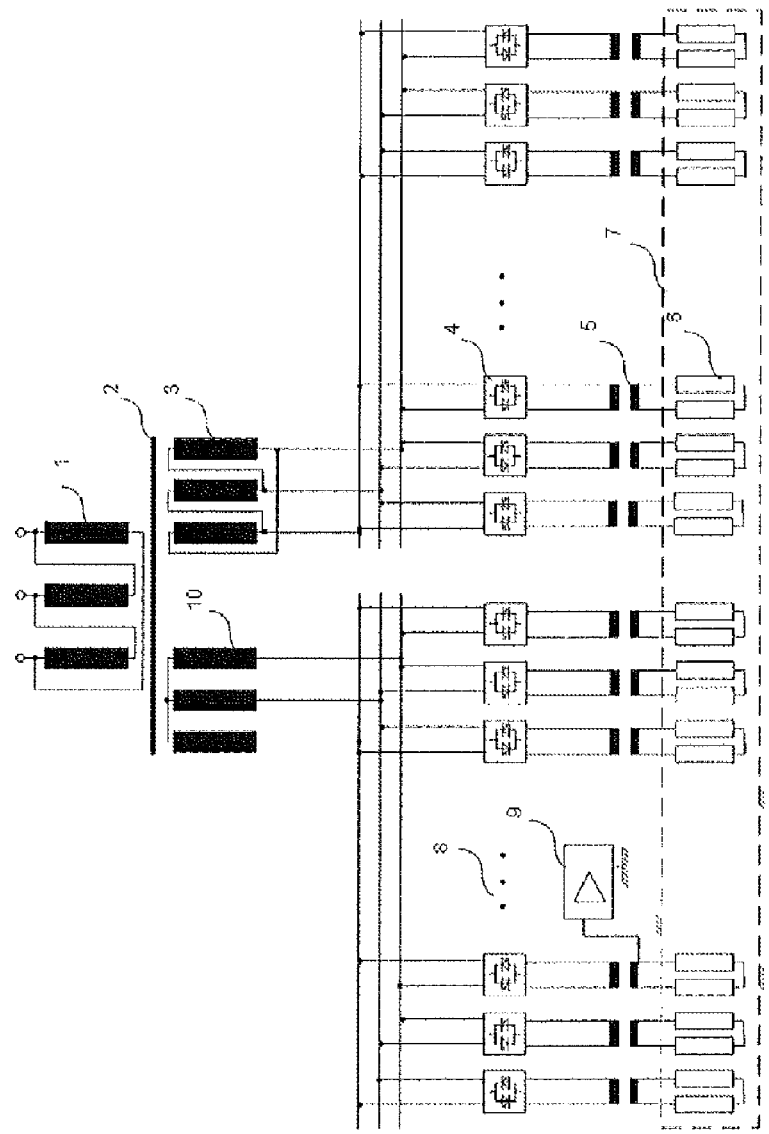
FIG. 2 shows a circuit arrangement for an embodiment of a device according to the invention.

FIG. 2 shows a corresponding circuit arrangement for a device according to the invention.

Not only can the subsystems be switched off, controlled and/or regulated separately, but they are also arranged separated in terms of electrical potential 5.

The number 8 of the heating elements is ideally divisible by six, i.e. for example 6, 12, 18, 24, 36 heating elements.

However, a different number of heating elements than this may also be envisaged.

By distributing the heating elements between a large number of electrical energy regulation or control apparatuses 4, it is possible to separately specify the heating energy for each heating element and therefore also adapt to the material data of the individual elements and the temperature data of the individual heating element positions inside the reactor.

The energy regulation or energy control apparatuses 4 are, as already mentioned above, preferably electrical power controllers, voltage inverters or variable transformers.

If a heater breaks, in the method according to the invention this does not lead to complete reactor failure, rather only to the loss of a small part of the heating energy. This can be compensated for by slightly increasing the power of the heating elements or groups of heating elements still remaining.

In order to extend the reactor operating time, reserve heating elements may also be connected up.

Furthermore, continuous heating element resistance calculation also makes continuous reaction to resistance changes due to corrosion or methanation of the heating elements possible.

Excessively hot heating elements can be cooled by reducing the rms supply voltage, and insufficiently hot heating elements can be heated by increasing this voltage.

Temperature differences in the reactor as a result of unequal gas flow rates in the reactor, unequal resistances of the heating elements or due to the reaction geometry can therefore be compensated for.

A particular advantage of this multiply potential-separated arrangement is that it is possible to install a separate ground fault detection circuit 9 for each electrical subsystem 5 and 6.

The effect of this is that, in the event of a ground fault, only the subsystem in question needs to be turned off.

Ground faults thus no longer lead to complete shutdown of the reactor as in the prior art, but instead to only a small part being shut down, namely a heating element 6 with associated isolating transformer 5 and control element or regulator 4.

Another advantage is the possibility of substantially using commercially available components such as power controllers 4 and isolating transformers 5 for the current supply system.

Owing to the multiple separation according to the invention into a large number of small subsystems, the necessary voltage at the individual subsystem is reduced in comparison with a long series circuit. This reduces the likelihood that damage due to contamination will take place in the reactor at the electrode seal or electrode insulation, triggered by electrical current from the electrode to the reactor wall.

In the case of such an event, if the ground fault detection fails, arc discharges against the reactor wall, which might damage the electrode, the seal or the wall, could occur.

Failure of the pressure containment and hazardous gas egress would result from this.

The multiple potential separation also reduces the likelihood that electrical currents from the electrode to the reactor wall will give rise to electrode seal or electrode insulation damage in the reactor.

In the event of a simple ground fault, current no longer flows to ground potential because the circuit is not closed.

By virtue of the large number of DC-isolated subsystems, it is also not possible for a high-energy short circuit to occur between all the electrodes of one phase and all the electrodes of another phase; rather it can then only happen between two electrodes of a subsystem.

Splitting the overall current supply energy into a large number of small current supply systems also correspondingly divides the possible energy in the event of a fault (flashing arc), which correspondingly divides the extent of damage in the event of a double fault according to the number of subsystems.

The short circuit current in the event of a fault is significantly reduced.

The splitting into a large number of electrical subsystems also offers further technical advantages.

Usually, commercially available power controllers 4 having two thyristor semiconductors arranged antiparallel are used as control elements for setting the electrical energy.

These power controllers can normally be operated in two different operating modes.

Mode A is phase-firing control. Mode B is wave-packet control.

In both modes, arrangements for reducing the electrical network feedback are possible.

In phase-firing control, the large number of subsystems can be split between two (3 and 10 in FIG. 2) three-phase systems, phase-shifted by 30°, of a primary transformer.

In this way, the strongest-amplitude higher-frequency (larger fundamental) current harmonics that occur in controllers during phase-firing operation are cancelled out purely computationally on the primary side of the input feed transformers 1, 2, 3, FIG. 1.

By a three-phase 3-winding arrangement of the primary transformer, the $3^{rd}$, $5^{th}$ and $7^{th}$ current harmonics can thereby be substantially eliminated.

In the wave-packet control mode, the wave packets can be temporally matched to one another so that in pulsed operation the usual load peaks on the network do not occur, but instead the overall reactor electrical power is absorbed uniformly distributed over time.

Splitting the energy between the various subsystems does increase the likelihood that a fault of a power controller will lead to failure, owing to the larger number of subsystems; nevertheless, this only affects one subsystem, and the entire heating does not fail as in the prior art.

A complete system shutdown is thus prevented.

Furthermore, the apparatuses can be arranged so that they can be repaired or replaced during operation of the other systems.

A superordinate reactor temperature regulator ensures that, if a subsystem fails, all the other systems are correspondingly increased in power.

There is therefore no disruption of the operating state.

When the subsystem is connected up again after repair, the superordinate regulator automatically steps the power for the other heating elements down again.

Furthermore, in connection with the splitting of the heating energy between a large number of heating elements, it is preferable to provide further protection of the heating elements.

Protection of the heating elements by chemically stable layers, for example Si or SiC, is particularly preferred.

Owing to the mutually separately regulatable or controllable power of the individual heating elements, the temperature of the individual heating element can be increased, while the reactor temperature is kept constant, by reducing the power of the rest of the heating elements. SiC, Si or C preferentially deposits on hot surfaces, i.e. preferentially on the hottest heater. As a result of the fact that the reactor temperature can be kept constant overall, attack by methanation of other components such as deviators or heat exchangers is avoided. Random deposition on other components is likewise avoided.

By the coating or repair of the heating elements during operation of the reactor, the lifetime of the heaters can be extended. The longer lifetime of the heaters increases the availability of the reactor and consequently also the annual production output of trichlorosilane.

The application of Si or SiC layers before or during operation is possible by adding silicon-containing gases, for example dichlorosilane or monosilane, as well as directly by process gas present anyway during the conversion of silicon tetrachloride, such as trichlorosilane.

The reactant gases of the conversion contain no carbon. In the case of graphite heating elements, SiC is formed from the carbon of the heating elements themselves. A corresponding material conversion takes place on the surfaces of the heating elements.

By depositing Si or SiC, the further chemical attack can be slowed down drastically.

By depositing silicon, the electrical resistance of the heating element can advantageously be influenced as desired, since Si is conductive at the usual high temperatures.

According to the invention, this method may then be carried out on individual heating elements without varying the overall energy input into the reactor or in general changing the reactor temperature, since the necessary temperature can respectively be arrived at with the element to be coated and the other heating elements can be adjusted so that the overall energy does not change, and the overall reactor temperature thus remains constant.

In this way, the individual heating element can be protected without departing from the operating setpoint for the rest of the reactor. The latter may be specified superordinately.

Thus, the individual heating elements can be coated successively without departing from the target operating point for the reaction per se.

The temperature change of the heating element when the process parameters vary may then be derived from the resistance change (calculated from a continuous current and voltage measurement per heating element).

The physical effect that the resistivity of ohmic resistances changes as a function of temperature is used for this.

Another possibility for protecting or mending carbon-containing heating elements which have already been damaged is active carbon deposition.

This is preferably carried out by controlled introduction of a carbon source, referred to below as a sacrificial carbon body.

By introducing a sacrificial carbon body at cooler positions in the reactor chamber, the carbon is converted there under a hydrogen atmosphere (such as is present for the reaction) into methane and is deposited at the hot positions (preferably above 1000° C.), for example on a single heating element.

This process may also be carried out according to the invention during operation successively (or alternatively only for damaged heaters) for each heating element independently.

The same applies for the use of internal installed reactor components as a carbon source, if they contain carbon.

Carbon-containing gases, for example methane or other hydrocarbons, which are additionally fed into the reactor in a controlled way, may also function as a carbon source.

The successful use of a sacrificial carbon body, internal installed reactor components as a carbon source or methane gas for this purpose is based on the methane partial pressure in a hydrogen atmosphere decreasing according to thermodynamic equilibrium with rising temperatures. For this reason, carbon is deposited on hot surfaces.

By combining Si-containing gases and an additional carbon source, for example methane gas, it is also possible to deposit an SiC layer on an individual heating element if the latter has its temperature set correspondingly high (for example more than 1200° C., particularly preferably more than 1500° C.)

Another embodiment provides a constant variation of the heating element temperature with a constant reactor temperature.

Since chemical attack on the carbon-containing heating elements takes place in very specific temperature ranges (between 700 and 1700° C.) and as a function of pressure (0-30 bar gauge) and reaction gas composition (monosilane, disilane, trichlorosilane, silicon tetrachloride, hydrogen, chlorine, hydrochloric acid, methane etc.), it is expedient to avoid or pass rapidly through certain temperature ranges in which the attack is greatest.

If this is not otherwise possible, it may be achieved by constant variation of the heating element temperature without changing the temperature for the rest of the reactor.

The following examples explain the method according to the invention and the device according to the invention in more detail, without restricting the invention to these examples.

Example 1

Example According to the Prior Art

A conventional reactor as described for example in DE 3024320 A1, having a reaction chamber and having a gas inlet opening and a gas outlet opening, was used. In order to simplify the structure, no heat exchanger units were used inside the reactor containment. In an external heat exchanger, silicon tetrachloride was evaporated with a mass flow rate of 30 kg/min and mixed with hydrogen preheated to about 80° C. with a mass flow rate of 0.712 kg/min in a static mixer. The gas mixture, consisting of silicon tetrachloride and hydrogen, was subsequently fed at a temperature of 132° C. through the gas inlet opening of the reactor into the reactor chamber. The operating pressure of the reactor was 20 bar gauge.

The heating of the reactor was carried out according to DE 3024320 A1. For this example, 6 heating elements were used. In each case, 2 heating elements formed a group. The heating elements consisted of graphite and had a star-shaped cross section. The cross section and the length of the heating element were matched with the current supply and the existing reactor. The heater geometry was furthermore selected so that the heater reached a temperature of about 1200° C. during operation. This temperature is so high that the formation of SiC takes place on the heater surface at a sufficient rate to protect the heater, but still does not present any problem for the electrode feedthrough.

In order to obtain a significant conversion of silicon tetrachloride to trichlorosilane, the heater needed to heat the gas mixture to 1000° C. Owing to a higher reaction temperature, the deviators and thermal insulations, which consist of a carbon-based material, would be attacked too strongly by methanation.

The heater temperatures listed below were set up, care being taken that the heating element groups were loaded approximately equally. This is possible since according to the prior art the phases can be regulated individually.

Table 1 shows the temperatures of the heating elements.

TABLE 1

| Phase 1 | Heating element A | 1120° C. |
|---|---|---|
|  | Heating element B | 1270° C. |
| Phase 2 | Heating element A | 1207° C. |
|  | Heating element B | 1220° C. |
| Phase 3 | Heating element A | 1205° C. |
|  | Heating element B | 1220° C. |

The problem with this regulation is also demonstrated here: heating element A of phase 1 has a temperature of 1120° C. At this temperature, the heater is subjected to strong chemical attack by methanation. The deposition of SiC took place only extremely slowly owing to the low temperature. The other heating elements are protected by the formation of an SiC layer, which is formed with a sufficiently rapid rate above 1200° C.

The running time of the reactor was limited by the running time of this heating element. For simplicity, the running time achieved is specified as 100%.

The different temperatures of the heating elements were caused by natural variations in the resistance of the heating elements. Dimension tolerances, different contacting qualities of the heating elements and inhomogeneous material are the reasons for this.

The running time of this reactor with this described arrangement was also normalized to 100%.

Example 2

Example According to the Invention

A substantial improvement was achieved using the device according to the invention: by the separate regulation of all 6 heating elements, it was possible to set the temperature of all the heating elements to 1209° C., so that the conversion of silanes and carbon to form SiC could take place equally rapidly on all the heaters. There was therefore no heater which was damaged prematurely and for this reason the whole reactor did not fail. It was thereby possible to increase the running time of the reactor to 137%.

The following change has been found to be particularly advantageous: because of the separate regulation of the heating elements, it was now also possible to use just 5 heating elements in the reactor. The power which was output by the 5 heating elements had to correspond to the power in the previous examples, since nothing had changed in terms of the operating constraints, i.e. pressure, temperature, flow rate. The temperature of the individual regulatable heating elements was 1240° C. The formation of SiC was therefore further accelerated, which increased the running time of the reactor to 149%.

A further reduction in the number of heating elements would lead to an even greater load on the remaining heating elements, which would cause premature failure of the reactor because of damage to the electrode seal.

Example 3

Example According to the Invention

Figure 3:
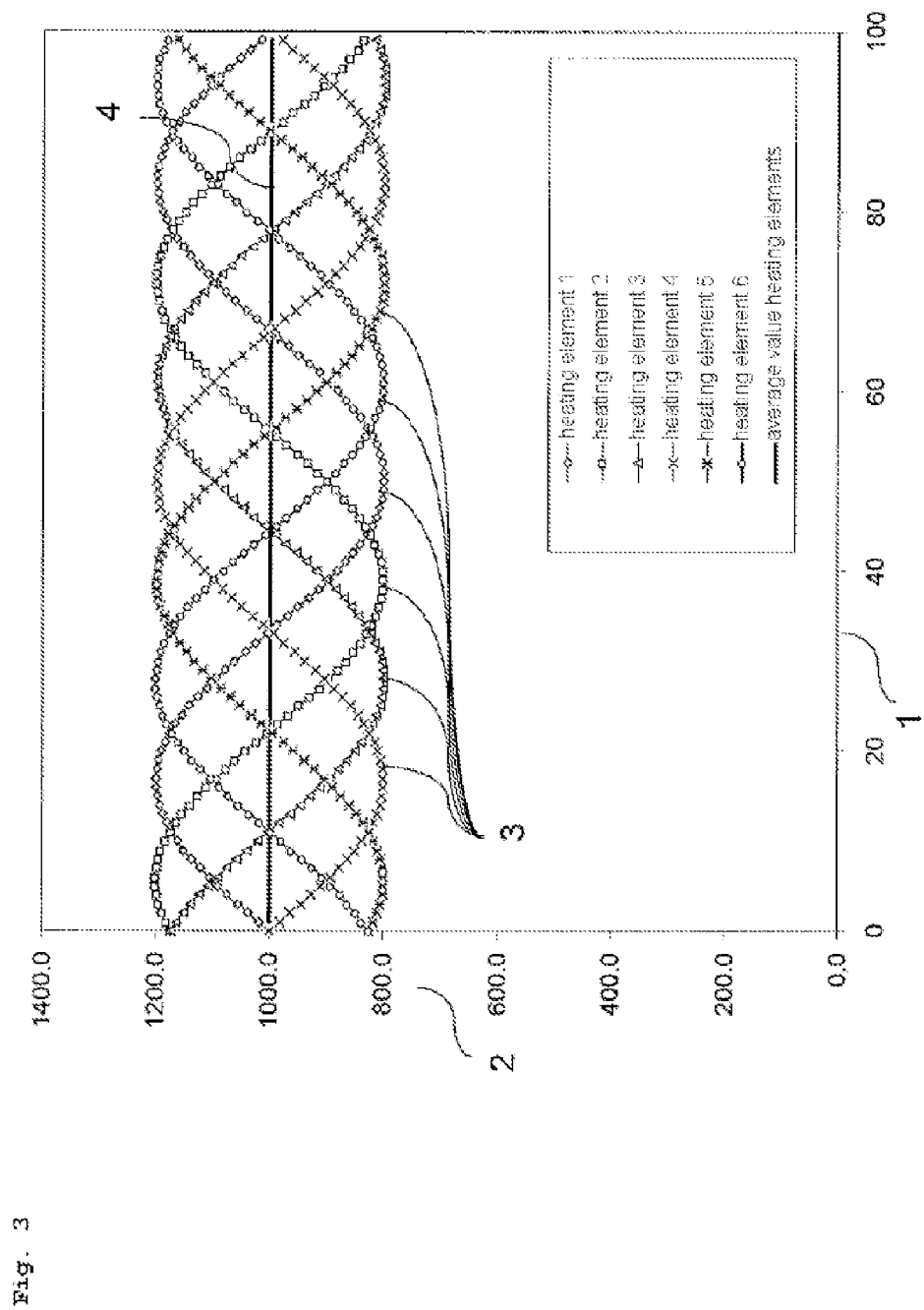
FIG. 3 shows a graph of variation of the temperature of the heating elements as a function of time.

A variation of the temperature of the heating elements as a function of time, which is represented in FIG. 3, was used. The X axis represents the time axis in days. The Y axis indicates the temperature in degrees Celsius. In this case, a heating system having six separately controllable heating elements was operated with an average heating element temperature 4 of 1000° C. The time-offset sinusoidally controlled heating element temperatures 3 give a constant reactor temperature of 850° C., although the temperatures of the individual heating elements 3 vary constantly.

In this way, the particularly harmful temperature point of 1000° C. was clearly avoided for the heaters, but at the same time the overall reactor was operated at the desired temperature of 850° C. and no local damage points occurred, i.e. the lifetime of the heating elements was significantly increased.

It proved particularly advantageous to select the period duration at between 10 h and 10000 h. The greatest effect is observable with a period duration of between 100 h and 2000 h.

The same effect can also be achieved with other periodic time-dependent functions, for example cosine squarewave, triangle, trapezium and sawtooth.

Example 4

Example According to the Invention

In contrast to Example 3, a non-periodic function was used (continual energy increase and decrease of individual heating elements with constant overall power). Surprisingly, a lifetime-increasing effect on the heating elements was also observed in this case.

What is claimed is:

1. A method for the thermal treatment of corrosive gases, wherein gases contained in a chamber are heated by at least four heating elements or four groups of heating elements comprising an electrically conductive material, wherein each heating element or each group of heating elements is connected to a separately regulatable and/or controllable subsystem of an electrical energy network, wherein each heating element or each group of heating elements is regulated and/or controlled separately and is heated by direct current flow, wherein each separately regulatable and/or controllable heating element or each separately regulatable and/or controllable group of heating elements is controlled or regulated with respect to at least one either identical or different value of a parameter selected from the group consisting of temperature, heating power, current, voltage and resistance or with respect to another heating element process variable, which can be influenced by the device, and wherein at least four regulatable and/or controllable subsystems are DC-isolated from ground potential and from one another.

2. The method as claimed in claim 1, wherein each regulatable and/or controllable subsystem of the electrical energy network is connected to current or voltage regulators.

3. The method as claimed in claim 2, wherein the current or voltage regulators are selected from the group consisting of AC power controllers, voltage inverters, rotary transformers and transductor.

4. The method as claimed in claim 1, wherein the heating elements are successively coated in situ at a constant power of the reactor with a material selected from the group consisting of SiC, Si and C.

5. The method as claimed in claim 4, wherein no increase in an overall reactor temperature takes place during the coating.

6. The method as claimed in claim 1, wherein the regulatable and/or controllable subsystems of the electrical energy network are respectively supplied from two three-phase systems of a primary transformer, which are phase-shifted by 30°.

7. The method as claimed in claim 1, wherein the regulatable and/or controllable subsystems of the electrical energy network are operated in phase firing with heating elements which have different electrical resistances.

8. The method as claimed in claim 1, wherein the regulatable and/or controllable subsystems of the electrical energy network are respectively operated in wave-packet and/or phase-firing control.

9. The method as claimed in claim 8, wherein operation is carried out in wave-packet control with controllers which are temporally matched to one another.

10. The method as claimed in claim 1, wherein a temperature profile of the heating elements as a function of time comprises a minimum temperature and a temperature function selected from the group consisting of a squarewave function, a triangle function, a sawtooth function, a sine function, a cosine function and a trapezium function.

11. The method as claimed in claim 1, wherein a temperature profile of the heating elements as a function of time contains both a minimum temperature and a non-periodically varying component.

12. A method for the thermal treatment of corrosive gases, wherein gases contained in a chamber are heated by at least four heating elements or four groups of heating elements comprising an electrically conductive material, wherein each heating element or each group of heating elements is connected to a separately regulatable and/or controllable subsystem of an electrical energy network, wherein each heating element or each group of heating elements is regulated and/or controlled separately and is heated by direct current flow, wherein each separately regulatable and/or controllable heating element or each separately regulatable and/or controllable group of heating elements is controlled or regulated with respect to at least one either identical or different value of a parameter selected from the group consisting of temperature, heating power, current, voltage and resistance or with respect to another heating element process variable, which can be influenced by the device, and wherein at least four regulatable and/or controllable subsystems are DC-isolated from ground potential, and wherein the regulatable and/or controllable subsystems of the electrical energy network are operated in phase firing with heating elements which have different electrical resistances.

13. A method for the thermal treatment of corrosive gases, wherein gases contained in a chamber are heated by at least four heating elements or four groups of heating elements comprising an electrically conductive material, wherein each heating element or each group of heating elements is connected to a separately regulatable and/or controllable subsystem of an electrical energy network, wherein each heating element or each group of heating elements is regulated and/or controlled separately and is heated by direct current flow, wherein each separately regulatable and/or controllable heating element or each separately regulatable and/or controllable group of heating elements is controlled or regulated with respect to at least one either identical or different value of a parameter selected from the group consisting of temperature, heating power, current, voltage and resistance or with respect to another heating element process variable, which can be influenced by the device, and wherein at least four regulatable and/or controllable subsystems are DC-isolated from ground potential, and wherein the regulatable and/or controllable subsystems of the electrical energy network are respectively operated in wave-packet and/or phase-firing control.

* * * * *